United States Patent
Shimizu et al.

(10) Patent No.: US 10,286,801 B2
(45) Date of Patent: May 14, 2019

(54) CHARGE SYSTEM TO IMPROVE BATTERY OPERATIONAL LIFE

(71) Applicant: TOYOTA JIDOSHA KABUSHIKI KAISHA, Toyota-shi, Aichi-ken (JP)

(72) Inventors: Takayuki Shimizu, Mountain View, CA (US); Akihisa Yokoyama, Toyota (JP); Kunihiko Kumita, Toyota-shi, Aichi-ken (JP); Tomoya Ohno, Toyota-shi, Aichi-ken (JP)

(*) Notice: Subject to any disclaimer, the term of this patent is extended or adjusted under 35 U.S.C. 154(b) by 965 days.

(21) Appl. No.: 14/462,006

(22) Filed: Aug. 18, 2014

(65) Prior Publication Data
US 2016/0047862 A1 Feb. 18, 2016

(51) Int. Cl.
*G01R 31/36* (2019.01)
*B60L 11/18* (2006.01)
(Continued)

(52) U.S. Cl.
CPC ....... *B60L 11/1838* (2013.01); *B60L 11/1846* (2013.01); *B60L 11/1848* (2013.01); *B60L 11/1857* (2013.01); *B60L 11/1861* (2013.01); *G06Q 20/145* (2013.01); *G07F 15/005* (2013.01); *H02J 3/00* (2013.01); *H02J 7/041* (2013.01); *B60L 2230/40* (2013.01); *B60L 2250/12* (2013.01); *B60L 2250/14* (2013.01);
(Continued)

(58) Field of Classification Search
CPC .............. B06L 11/1138; B06L 11/1861; B06L 11/1846; B06L 11/1857; H02J 7/041; H02J 3/00; G07F 15/005; B60L 11/1838; B60L 11/1846; B60L 11/1848; B60L 11/1857; B60L 11/1861; B60L 2250/12; B60L 2250/14; B60L 2260/52; Y02T 90/169; Y02T 90/14; Y04S 30/14; G06Q 20/145

See application file for complete search history.

(56) References Cited

U.S. PATENT DOCUMENTS

2009/0322340 A1* 12/2009 Zhang ................. H01M 10/486
324/433
2012/0293121 A1* 11/2012 Horii ................... G01R 31/3606
320/109
(Continued)

FOREIGN PATENT DOCUMENTS

JP 2012060713 A 3/2012

*Primary Examiner* — Sujoy K Kundu
*Assistant Examiner* — L. Anderson
(74) *Attorney, Agent, or Firm* — Burbage Law, P.C.; Jon-Michael Burbage; Elizabeth Ruzich

(57) ABSTRACT

The disclosure includes a system and method for providing charging services to mobile client devices. The system includes a processor and a memory storing instructions that, when executed, cause the system to: estimate a departure time of a future journey associated with a mobile client device; verify one or more electrical characteristics of a battery associated with the mobile client device; determine a target state of charge for the battery at the departure time; and determine a charge scheme to improve an operational life of the battery. The charge scheme has a combining charge cost that satisfies a charge objective of the mobile client device. The combining charge cost includes a weighted combination of a power cost and a battery degradation cost. The charge scheme is configured to charge the battery to achieve the target state of charge at the departure time.

20 Claims, 8 Drawing Sheets

(51) Int. Cl.
*H02J 3/00* (2006.01)
*H02J 7/04* (2006.01)
*G06Q 20/14* (2012.01)
*G07F 15/00* (2006.01)
*H02J 3/14* (2006.01)

(52) U.S. Cl.
CPC ..... *B60L 2260/52* (2013.01); *H02J 2003/007* (2013.01); *H02J 2003/146* (2013.01); *Y02T 10/7005* (2013.01); *Y02T 10/705* (2013.01); *Y02T 10/7044* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

2013/0093393 A1     4/2013   Shimotani et al.
2013/0317690 A1*   11/2013   Fujita ................... H01M 10/48
                                                                                701/29.2

* cited by examiner

CHARGE SYSTEM TO IMPROVE BATTERY OPERATIONAL LIFE

BACKGROUND

The specification relates to providing charging services to mobile client devices. In particular, the specification relates to determining charge schemes to charge mobile client devices.

As more and more people favor clean and sustainable energy, the usage of electric vehicles and/or hybrid electric vehicles grows dramatically. Existing charging solutions may include charging a vehicle when the vehicle is connected to a power source wirelessly or via a charging cable. Existing charging solutions may fail to consider other factors that may affect the charging of the vehicle. For example, existing charging solutions may fail to consider power usage costs and battery degradation when charging the vehicle.

SUMMARY

According to one innovative aspect of the subject matter described in this disclosure, a system for providing charging services to mobile client devices includes a processor and a memory storing instructions that, when executed, cause the system to: estimate a departure time of a future journey associated with a mobile client device; verify one or more electrical characteristics of a battery associated with the mobile client device; determine a target state of charge for the battery at the departure time responsive to verifying the one or more electrical characteristics of the battery; and determine a charge scheme to improve an operational life of the battery. The charge scheme may have a combining charge cost that satisfies a charge objective of the mobile client device. The combining charge cost includes a weighted combination of a power cost and a battery degradation cost. The charge scheme is configured to charge the battery of the mobile client device to achieve the target state of charge at the departure time.

In general, another innovative aspect of the subject matter described in this disclosure may be embodied in methods that include: estimating a departure time of a future journey associated with a mobile client device; verifying one or more electrical characteristics of a battery associated with the mobile client device; determining a target state of charge for the battery at the departure time responsive to verifying the one or more electrical characteristics of the battery; and determining a charge scheme to improve an operational life of the battery. The charge scheme may have a combining charge cost satisfying a charge objective of the mobile client device. The combining charge cost includes a weighted combination of a power cost and a battery degradation cost. The charge scheme is configured to charge the battery of the mobile client device to achieve the target state of charge at the departure time.

Other aspects include corresponding methods, systems, apparatus, and computer program products for these and other innovative aspects.

These and other implementations may each optionally include one or more of the following operations and features. For instance, the features include: receiving data describing one or more demand response requirements; determining one or more available time slots that satisfy the one or more demand response requirements; determining a set of potential charge schemes based on the one or more available time slots, each potential charge scheme configured to include one or more corresponding time slots from the one or more available time slots, each potential charge scheme configured to charge the battery to achieve the target state of charge at a charge completion time before the departure time; estimating a set of power costs for the set of potential charge schemes; estimating a set of battery degradation costs for the set of potential charge schemes; determining a set of combining charge costs for the set of potential charge schemes based on the set of power costs and the set of battery degradation costs; determining the charge scheme as a potential charge scheme associated with a minimal combining charge cost from the set of combining charge costs; the battery degradation cost including one or more of a speed degradation cost, a temperature degradation cost, a high-state of charge (SOC) degradation cost, and a low-SOC degradation cost; the power cost being associated with a first scaling factor; the battery degradation cost being associated with a second scaling factor; the combining charge cost including a sum of the power cost weighted by the first scaling factor and the battery degradation cost weighted by the second scaling factor; the charge objective including one or more of charging the battery of the mobile client device with reduced power costs and extending the operational life of the battery; the one or more electrical characteristics of the battery including waveform characteristics and a lag time associated with the battery; and the mobile client device including a vehicle.

The disclosure is particularly advantageous in a number of respects. For example, the system described herein may determine a battery-friendly charge scheme for a vehicle. A battery-friendly charge scheme may include a charge scheme to improve an operational life of a battery coupled to a vehicle. The battery-friendly charge scheme may extend an operational life of the battery, reduce a risk of overloading a power grid system due to the charging, complete charging the battery prior to a start of a future journey, and reduce a cost of power used to charge the battery. Since the operational life of the battery may be extended if battery-friendly charge schemes are used to charge the battery, a user may not need to replace the battery with a new one during the extended operational life of the battery and may therefore save money. In another example, the system is capable of determining individualized battery-friendly charge schemes for a group of vehicles in a local area. The system may avoid overloading a power grid system in the local area by controlling the vehicle charging according to the individualized battery-friendly charge schemes. The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
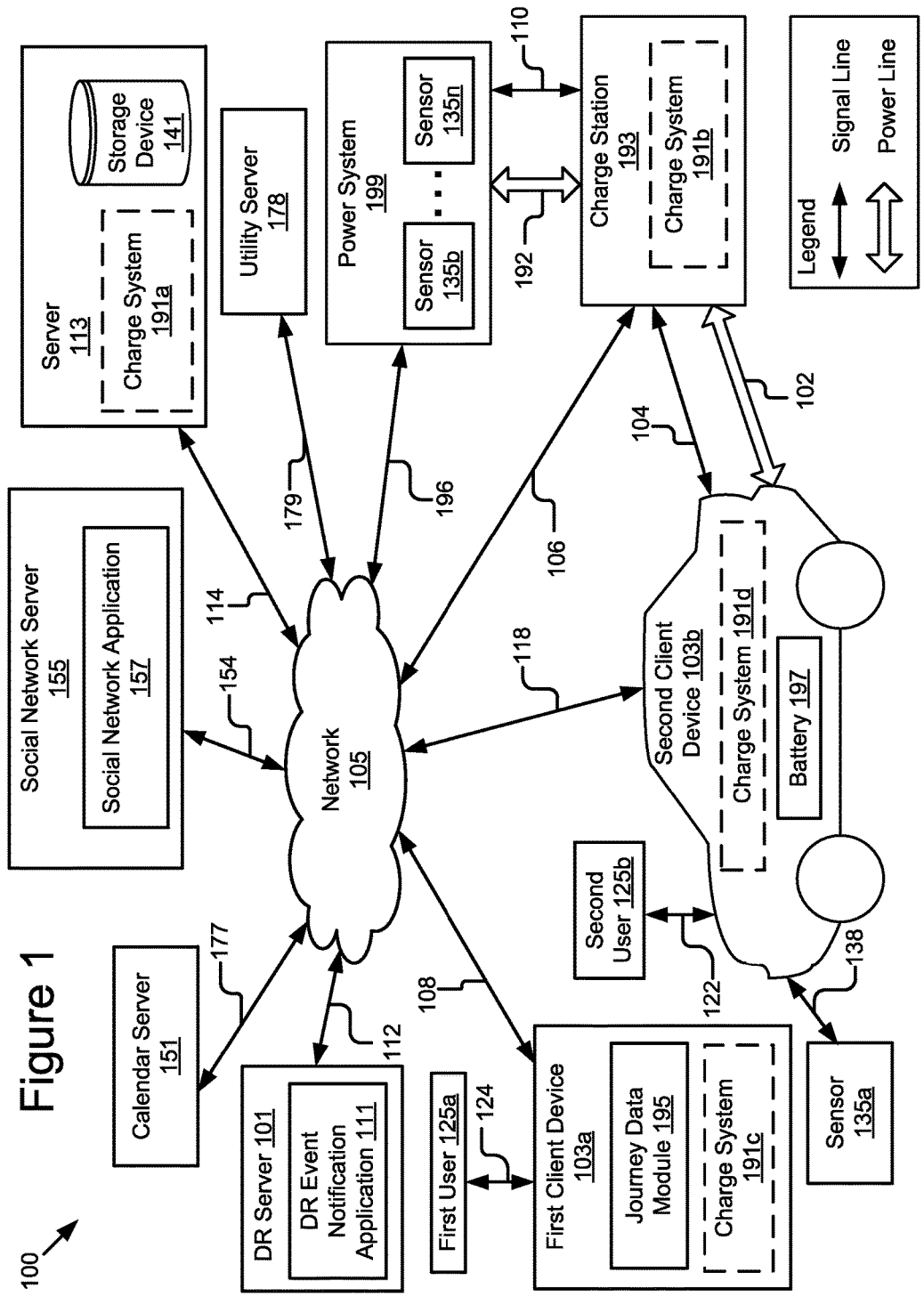
FIG. 1 is a block diagram illustrating an example system for providing charging services to mobile client devices.

FIG. 1 illustrates a block diagram of some implementations of a system 100 for providing charging services to mobile client devices. The system 100 includes a demand response (DR) server 101, a server 113, a calendar server 151, a social network server 155, a charge station 193, a power system 199, a utility server 178, a first client device 103a, and a second client device 103b (also referred to herein individually and collectively as client device 103). The first client device 103a and the second client device 103b can be accessed by users 125a and 125b (also referred to herein individually and collectively as user 125), respectively. In the illustrated implementation, these entities of the system 100 may be communicatively coupled via a network 105. The system 100 may include other servers or devices not shown in FIG. 1 including, for example, a traffic server for providing traffic data, a weather server for providing weather data, and a map server for providing map data, etc.

The client devices 103a and 103b in FIG. 1 are used by way of example. While FIG. 1 illustrates two client devices 103a and 103b, the disclosure applies to a system architecture having one or more client devices 103. Furthermore, although FIG. 1 illustrates one network 105 coupled to the client devices 103, the DR server 101, the server 113, the calendar server 151, the social network server 155, the charge station 193, the utility server 178, and the power system 199, in practice one or more networks 105 can be connected to these entities. While FIG. 1 includes one DR server 101, one server 113, one calendar server 151, one social network server 155, one charge station 193, one utility server 178, and one power system 199, the system 100 could include one or more DR servers 101, one or more servers 113, one or more calendar servers 151, one or more social network servers 155, one or more charge stations 193, one or more utility servers 178, and one or more power systems 199.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a global positioning system (GPS) satellite for providing GPS navigation to the client devices 103a and 103b. The network 105 may be a mobile data network such as third-generation (3G), fourth-generation (4G), long-term evolution (LTE), Voice-over-LTE ("VoLTE") or any other mobile data network or combination of mobile data networks.

In some implementations, a charge system 191a can be operable on the server 113. The server 113 can be a hardware server that includes a processor, a memory, and network communication capabilities. In the illustrated implementation, the server 113 is coupled to the network 105 via a signal line 114. The server 113 sends and receives data to and from other entities of the system 100 via the network 105. The server 113 includes a storage device 141 for storing data to provide the functionality described herein. The storage device 141 is described below in more detail.

In some implementations, a charge system 191b can be operable on the charge station 193. The charge station 193 may be an infrastructure element that supplies electric power for recharging a battery associated with a client device. For example, the charge station 193 may provide electric power for recharging batteries in all-electric vehicles, neighborhood electric vehicles, or plug-in hybrid electric vehicles. In some implementations, the charge station 193 may be a household charge station. In some other implementations, the charge station 193 may be a public charge station on a street or a parking lot. Other types of charge stations 193 are possible.

In some implementations, the charge station 193 is communicatively coupled to the network 105 via a signal line 106 for communicating with the power system 199, the client devices 103, or other entities of the system 100. Alternatively or additionally, the charge station 193 may be directly coupled to the power system 199 via a signal line 110. The charge station 193 may be directly coupled to the second client device 103b via a signal line 104. In the illustrated implementation, the charge station 193 is also electrically coupled to the power system 199 via a power line 192. The charge station 193 is electrically coupled to the second client device 103b via a power line 102. The power lines 102 and 192 each may represent a wired power supply channel (e.g., an electricity line) or a wireless power supply channel.

In some implementations, a charge system 191c can be operable on the first client device 103a. The first client device 103a may be a computing device that includes a memory and a processor, for example, a laptop computer, a desktop computer, a tablet computer, a mobile telephone, a personal digital assistant ("PDA"), a mobile e-mail device, a portable game player, a portable music player, a television with one or more processors embedded therein or coupled thereto, or another electronic device capable of accessing the network 105. In some implementations, the charge system 191c may act in part as a thin-client application that may be stored on the first client device 103a and in part as components that may be stored on one or more of the server 113, the charge station 193, and the second client device 103b. In the illustrated implementation, the first client device 103a is communicatively coupled to the network 105 via a signal line 108. The first user 125a may interact with the first client device 103a via a signal line 124.

In some implementations, a charge system 191d can be operable on the second client device 103b. The second client device 103b can be a mobile client device, and a battery 197 can be mounted on or coupled to the mobile client device. For example, the second client device 103b can be one of a vehicle (e.g., an automobile, a bus), a bionic implant, or any other mobile system including non-transitory computer electronics and a battery. In some implementations, the second client device 103b may include a computing device that includes a memory and a processor. In the illustrated implementation, the second client device 103b is communicatively coupled to the network 105 via a signal line 118. The second user 125*b* may interact with the second client device 103*b* via a signal line 122.

In some implementations, the first user 125*a* and the second user 125*b* can be the same user 125 interacting with both the first client device 103*a* and the second client device 103*b*. For example, the user 125 can be a passenger or a driver that operates the second client device 103*b* (e.g., a vehicle) and the first client device 103*a* (e.g., a smartphone). In some other implementations, the first user 125*a* and the second user 125*b* may be different users 125 that interact with the first client device 103*a* and the second client device 103*b*, respectively.

In some implementations, the second client device 103*b* may include one or more sensors (e.g., a sensor 135*a*). The sensor 135*a* may be coupled to the second client device 103*b* via a signal line 138. Example sensors may include, but are not limited to, a navigation sensor (e.g., a global positioning system (GPS) sensor), an infrared detector, a motion detector, a thermostat, a sound detector, and any other type of sensors. For example, the second client device 103*b* may include sensors for measuring one or more of a current time, a location (e.g., a latitude, longitude, and altitude of a location), an acceleration of a vehicle, a velocity of a vehicle, a fuel tank level, and a current state of charge (SOC) of the battery 197, etc. The sensors may generate sensor data describing the measurements and send the sensor data to the charge system 191*d*.

The charge system 191 (e.g., the charge system 191*a*, 191*b*, 191*c*, or 191*d*) can be a system that provides charging services to mobile client devices. In some implementations, the charge system 191 can be implemented using hardware including a field-programmable gate array ("FPGA") or an application-specific integrated circuit ("ASIC"). In some other implementations, the charge system 191 can be implemented using a combination of hardware and software. The charge system 191 may be stored in a combination of the devices and servers, or in one of the devices or servers. The charge system 191 may be described below in more detail with reference to FIGS. 3-5C.

In some implementations, the charge system 191 may use one or more of user-related information, battery-related information, and utility-related information to determine a charge scheme for charging a battery associated with a mobile client device. The user-related information may include, but is not limited to: a departure time of a future journey associated with a user; a total amount of power or energy to be charged, which may be determined based on the user's future journey; and one or more charge preferences associated with the user (e.g., charging the mobile client device with a cost priority, a battery life priority, or a DR priority), etc. The battery-related information may include, but is not limited to, a charging type (e.g., direct current (DC) charging, alternate current (AC) charging), a charging power (e.g., an amount of power charged per second, per minute, or per hour), a battery type, and battery characteristics (e.g., a battery capacity, battery degradation characteristics, a lag time, etc.), etc. The utility-related information may include, but is not limited to, power rates and DR signals (e.g., direct load control signals), etc.

In some implementations, the user-related information, the battery-related information, and the utility-related information may be manually inputted by the user. Alternatively, the user-related information may be determined based on historical journey data associated with the user or the mobile client device. The battery-related information may be obtained from the mobile client device through wired or wireless communication. The utility-related information may be obtained from the utility server 178 or the DR server 101.

The power system 199 may be an electric power system, which is communicatively coupled to the network 105 via a signal line 196. In some implementations, the power system 199 includes a power grid system. The power system 199 supplies electric power to the charge station 193 for charging the battery 197 in the second client device 103*b*. The power system 199 may supply power to multiple charge stations 193 in a local area for charging vehicles in the local area. Alternatively or additionally, the power system 199 includes a home energy management system (HEMS) that manages household power usage at home. The HEMS system may supply power to a home charge station for charging vehicles at home.

In some implementations, the power system 199 includes one or more sensors 135*b* and 135*n* (referred to collectively and individually as sensor 135). The one or more sensors 135 may be configured to monitor a status of the power system 199. For example, the one or more sensors 135 may be configured to monitor a power supply status and a power demand status in the power system 199. The one or more sensors 135 may be configured to provide other functionality in the power system 199.

The storage device 141 can be a non-transitory storage medium that stores data for providing the functionality described herein. The storage device 141 may be a dynamic random access memory (DRAM) device, a static random access memory (SRAM) device, flash memory, or some other memory devices. In some implementations, the storage device 141 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage device 141 stores time synchronicity data, historical journey data, user profile data, power rate data, and any other data for providing the functionality described herein. The historical journey data associated with a user may describe historical journeys taken by the user. For example, the historical journey data includes data describing one or more of a start point, an end point, a departure time from the start point, an arrival time at the end point, a route, a journey duration, a direction, and other journey context data associated with a journey taken by the user. The user profile data can be data describing user profiles. For example, the user profile data associated with a user includes a user name, an e-mail address, user preferences, hobbies, interests, education, work experience, and other demographic data describing the user. Other example user profile data is possible. The power rate data may describe power rates for power usage in different times. For example, the power rate data may include a power rate chart describing how the power rate is changed during different hours in a day.

The DR server 101 can be a hardware server that includes a processor, a memory, and network communication capabilities. In the illustrated implementation, the DR server 101 is coupled to the network 105 via a signal line 112. The DR server 101 sends and receives data to and from one or more of the client devices 103, the server 113, the charge station 193, the utility server 178, and the power system 199 via the network 105. For example, the DR server 101 sends DR events to the charge system 191 via the network 105.

DR may be described as the changes in electricity usage by end-use customers from their normal consumption patterns in response to changes in the price of electricity over time. DR may also relate to incentive payments designed to induce lower electricity use at times of high wholesale market prices or when the electricity grid is unreliable. DR may include all intentional modifications to consumption patterns of electricity of end-use customers that are intended to alter the timing, level of instantaneous demand, or the total electricity consumption.

In the illustrated implementation, the DR server 101 includes a DR event notification application 111. The DR event notification application 111 can include code and routines for generating and sending DR events to the charge system 191, the utility server 178, the power system 199, or other entities of the system 100. A DR event may be an event related to demand response in a power grid system. For example, a DR event may be an event indicating that: (1) a price for electricity is scheduled to increase during a certain time period; and (2) the client device 103 is requested to reduce its consumption of electricity under a specific usage amount. A DR event may include a DR event start time and a DR event end time, and a time period between the DR event start time and the DR event end time forms a DR event period.

In some implementations, a DR event includes one or more DR requirements for regulating power usage. For example, a DR event indicates that the power usage between 6:00 PM and 11:00 PM at a user's home may not exceed a predetermined amount of electricity. In another example, a DR event may specify that charging vehicles during a DR event period may not be allowed since power demand in a corresponding regional power grid network may exceed a threshold during the DR event period.

The calendar server 151 can be a hardware server that includes a processor, a memory, and network communication capabilities. In the illustrated implementation, the calendar server 151 is coupled to the network 105 via a signal line 177. The calendar server 151 sends and receives data to and from other entities of the system 100 via the network 105. For example, the calendar server 151 sends data describing a user's calendar to the charge system 191 with permission from the user.

The social network server 155 can be a hardware server that includes a processor, a memory, and network communication capabilities. In the illustrated implementation, the social network server 155 is coupled to the network 105 via a signal line 154. The social network server 155 sends and receives data to and from other entities of the system 100 via the network 105. The social network server 155 includes a social network application 157. A social network can be a type of social structure where the users 125 may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

The social network server 155 and the social network application 157 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

The utility server 178 can be a hardware server that includes a processor, a memory, and network communication capabilities. In the illustrated implementation, the utility server 178 is coupled to the network 105 via a signal line 179. The utility server 178 sends and receives data to and from other entities of the system 100 via the network 105. For example, the utility server 178 sends data describing power rates in a local area to the charge system 191 and the DR server 101. The utility server 178 may receive data describing an amount of power used to charge a vehicle at the charge station 193.

In some implementations, the first client device 103a includes a journey data module 195. The journey data module 195 may include code and routines for recording journey data associated with a user or a vehicle. In some implementations, the journey data module 195 can be implemented using hardware including an FPGA or an ASIC. In some other implementations, the journey data module 195 can be implemented using a combination of hardware and software. The journey data module 195 may be stored in a combination of the devices and servers, or in one of the devices or servers. The journey data module 195 is described below in more detail with reference to FIG. 2.

Example Journey Data Module

Figure 2:
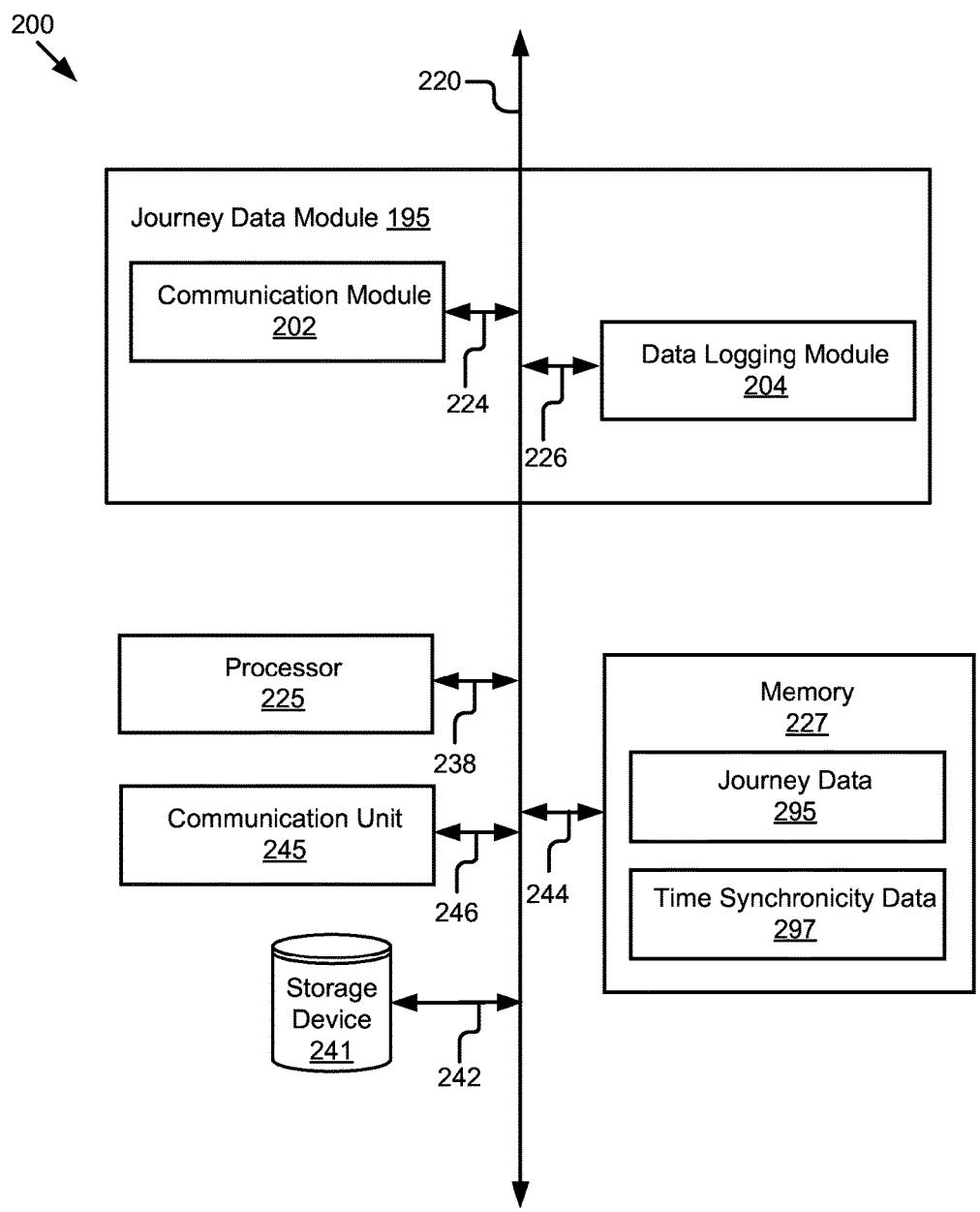
FIG. 2 is a block diagram illustrating an example computing device that includes an example journey data module.

Referring now to FIG. 2, an example of the journey data module 195 is shown in more detail. FIG. 2 is a block diagram of a computing device 200 that includes the journey data module 195, a processor 225, a communication unit 245, a storage device 241, and a memory 227 according to some examples. The components of the computing device 200 are communicatively coupled by a bus 220. In some implementations, the computing device 200 can be one of the server 113, the first client device 103a, and the second client device 103b.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores journey data 295 and time synchronicity data 297. The journey data 295 may include data describing a user's historical journeys. The time synchronicity data 297 can be data used to synchronize a device time with a universal time. For example, the time synchronicity data 297 can be configured to synchronize a local time associated with a vehicle with a universal time. In some implementations, a local time may be synchronized with the Coordinated Universal Time (UTC) defined by International Telecommunications Union Recommendation (ITU-R TF.460-6) according to a corresponding local time zone. In some other implementations, a local time may be synchronized by timekeeping technologies including GPS satellites and a network time protocol (NTP). The network time protocol may include a networking protocol for clock synchronization between computer systems over packet-switched variable-latency data networks.

The communication unit 245 transmits and receives data to and from at least one of the client devices 103, the charge station 193, the server 113, and any other entities of the system 100. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with the client devices 103 or the server 113. In some implementations, the communication unit 245 includes a wireless transceiver for exchanging data with the client devices 103 or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage device 241 can be a non-transitory storage medium that stores data for providing the functionality described herein. The storage device 241 may be a dynamic random access memory (DRAM) device, a static random access memory (SRAM) device, flash memory, or some other memory devices. In some implementations, the storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 241 is communicatively coupled to the bus 220 via a signal line 242. The storage device 241 may also store data that was temporarily stored in the memory 227.

In the illustrated implementation, the journey data module 195 includes a communication module 202 and a data logging module 204. The components of the journey data module 195 are communicatively coupled to the bus 220. For example, the communication module 202 is communicatively coupled to the bus 220 via a signal line 224. The data logging module 204 is communicatively coupled to the bus 220 via a signal line 226.

The communication module 202 can be software including routines for handling communications between the journey data module 195 and other components of the computing device 200. The communication module 202 sends and receives data, via the communication unit 245, to and from one or more of the client device 103, the server 113, and the charge station 193 depending upon where the journey data module 195 is stored. In some implementations, the communication module 202 receives journey data from the data logging module 204 and stores the journey data in one or more of the storage device 241 and the memory 227. In some implementations, the communication module 202 retrieves journey data from the storage device 241 or the memory 227 and sends the journey data to the data logging module 204.

The data logging module 204 can be software including routines for aggregating journey data describing one or more journeys associated with a user or the client device 103. For example, the data logging module 204 records journey data associated with a vehicle or a user and stores the journey data in the storage device 241 or the memory 227 via the communication module 202. Additionally or alternatively, the data logging module 204 uploads the journey data to the server 113 via the communication module 202 and the communication unit 245. Additionally or alternatively, the data logging module 204 sends the journey data to the charge system 191 via the communication module 202 and the communication unit 245.

The journey data recorded by the data logging module 204 includes, but is not limited to, an identifier (ID) identifying the client device 103 (e.g., a vehicle identification number), one or more user IDs identifying one or more users associated with the client device 103 (e.g., a driver in a vehicle, a passenger in the vehicle), a start point, a destination, a journey duration, a route, a time of arrival, a time of departure, one or more points of interest along the route, and other data associated with a related journey.

Example Charge System

Figure 3:
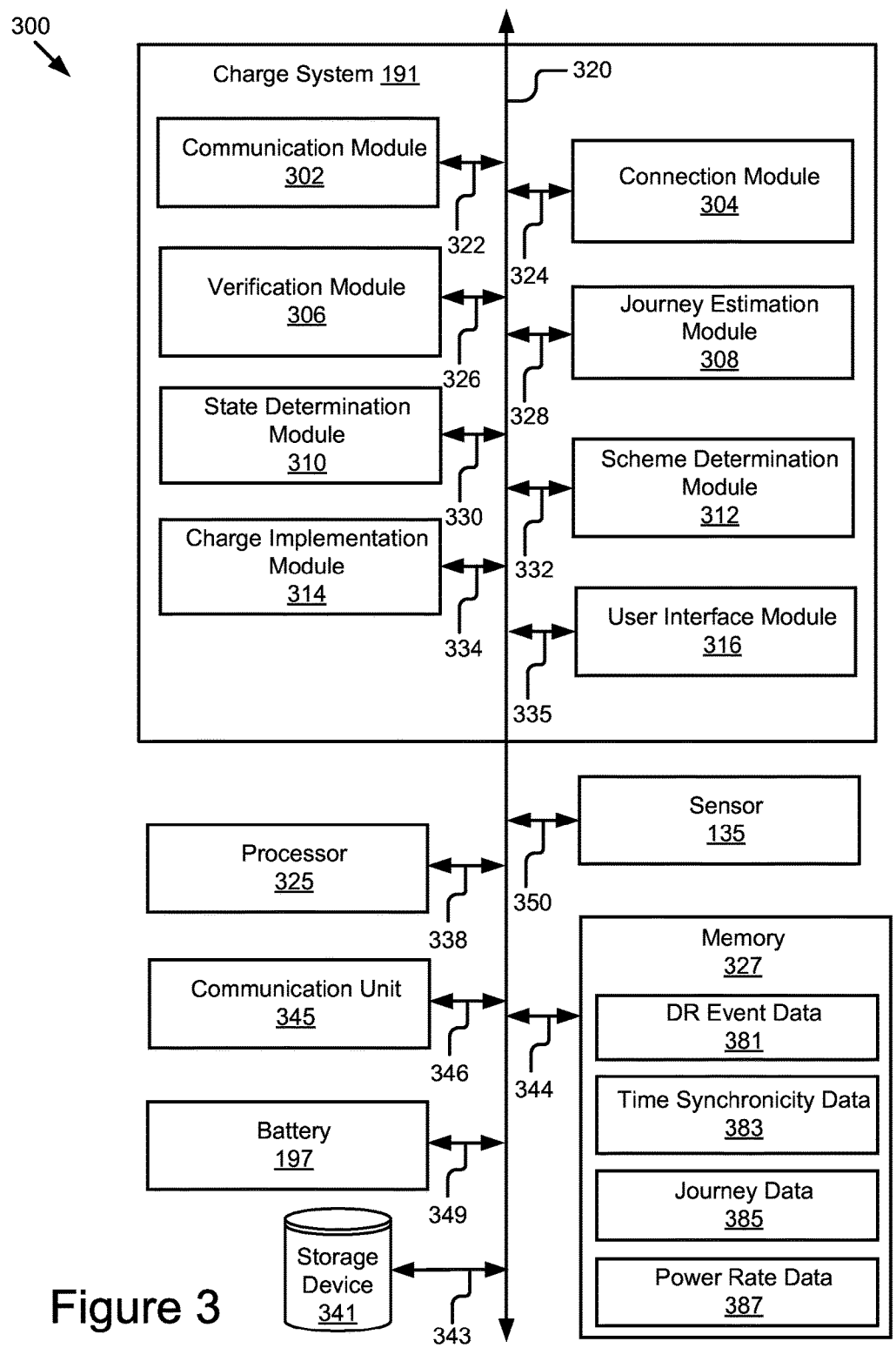
FIG. 3 is a block diagram illustrating an example computing device that includes an example charge system.

Referring now to FIG. 3, an example of the charge system 191 is shown in more detail. FIG. 3 is a block diagram of a computing device 300 that includes the charge system 191, a processor 325, a communication unit 345, a storage device 341, and a memory 327 according to some examples. The components of the computing device 300 are communicatively coupled by a bus 320. In some implementations, the computing device 300 additionally includes the sensor 135 coupled to the bus 320 via a signal line 350 and the battery 197 coupled to the bus 320 via a signal line 349. In some implementations, the computing device 300 can be one of the server 113, the first client device 103a, the second client device 103b, the charge station 193, and another server or device that may include the charge system 191.

The processor 325 is coupled to the bus 320 for communication with other components of the computing device 200 via a signal line 338. The memory 327 is coupled to the bus 320 for communication with other components via a signal line 344. The communication unit 345 is coupled to the bus 320 for communication with other components via a signal line 346. The storage device 341 is coupled to the bus 320 for communication with other components via a signal line 343. The processor 325, the memory 327, the communication unit 345, and the storage device 341 may provide functionalities similar to those described above for the processor 225, the memory 227, the communication unit 245, and the storage device 241 of FIG. 2, respectively. Description for the processor 325, the memory 327, the communication unit 345, and the storage device 341 will not be repeated here.

As illustrated in FIG. 3, the memory 327 stores DR event data 381, time synchronicity data 383, journey data 385, and power rate data 387. The DR event data 381 can be data describing one or more DR events. For example, the DR event data 381 may include an event start time and an event end time for each DR event. In another example, the DR event data 381 may specify one or more DR event periods within which no vehicle charging is recommended. The time synchronicity data 383 and the journey data 385 may include data similar to the time synchronicity data 297 and the journey data 295 of FIG. 2, respectively. Description for the time synchronicity data 383 and the journey data 385 will not be repeated here. The power rate data 387 may describe power rates in different times. For example, the power rate data 387 describes a chart depicting changes of a power rate in a day, in a month, or in a season for a particular region.

In the illustrated implementation shown in FIG. 3, the charge system 191 includes a communication module 302, a connection module 304, a verification module 306, a journey estimation module 308, a state determination module 310, a scheme determination module 312, a charge implementation module 314, and a user interface module 316. These components of the charge system 191 are communicatively coupled to each other via the bus 320.

In some implementations, components of the charge system 191 can be stored in a single server or device. In some other implementations, components of the charge system 191 can be distributed and stored across multiple servers or devices. For simplicity and convenience purpose, the various components of the charge system 191 in FIG. 3 are described below with reference to a vehicle, which is an example of a mobile client device. However, the description is not intended to limit the scope of the disclosure, and the description is also applicable to other examples of mobile client devices. Furthermore, the separation of various components, modules, and servers in the implementations described herein should not be understood as requiring such separation in all implementations, and in some implementations the described components, modules, devices, or servers can generally be integrated together in a single component, module, device, or server.

In some implementations, each component of the charge system 191 (e.g., the module 302, 304, 306, 308, 310, 312, 314, or 316) can be stored in the memory 327 of the computing device 300 and can be accessible and executable by the processor 325. Each component of the charge system 191 may be adapted for cooperation and communication with the processor 325 and other components of the computing device 300 via the bus 320.

The communication module 302 can be software including code and routines for handling communications between the charge system 191 and other components of the computing device 300. The communication module 302 may be coupled to the bus 320 via a signal line 322. The communication module 302 sends and receives data, via the communication unit 345, to and from one or more of the client device 103, the server 113, the DR server 101, the calendar server 151, the social network server 155, the charge station 193, the utility server 178, and the power system 199 depending upon where the charge system 191 is stored. For example, the communication module 302 receives, via the communication unit 345, calendar data associated with a user from the calendar server 151 and sends the calendar data to the journey estimation module 308. In another example, the communication module 302 receives graphical data for providing a user interface to a user from the user interface module 316 and sends the graphical data to the client device 103, causing the client device 103 to present the user interface to the user.

In some implementations, the communication module 302 receives data from components of the charge system 191 and stores the data in one or more of the storage device 341 and the memory 327. For example, the communication module 302 receives data describing a charge scheme from the scheme determination module 312 and stores the data in the storage device 341. In some implementations, the communication module 302 retrieves data from the storage device 341 or the memory 327 and sends the data to one or more components of the charge system 191. For example, the communication module 302 receives the journey data 385 from the memory 327 and sends the journey data 385 to the journey estimation module 308.

In some implementations, the communication module 302 may handle communications between components of the charge system 191. For example, the communication module 302 receives data describing a charge scheme from the scheme determination module 312 and sends the data to the charge implementation module 314.

The connection module 304 can be software including routines for detecting whether a vehicle is electrically connected to a power source. The connection module 304 may be coupled to the bus 320 via a signal line 324. In some implementations, the connection module 304 detects whether a vehicle is electrically connected to the charge station 193. For example, the connection module 304 receives sensor data from the one or more sensors 135 and determines that the vehicle is wirelessly connected to the charge station 193 based on the sensor data. The vehicle is ready to be charged wirelessly by the charge station 193. In another example, the connection module 304 determines that the vehicle is connected to the charge station 193 using a power cord. The vehicle is ready to be charged by the charge station 193 using the power cord. A time when the vehicle is connected to the charge station 193 may be referred to as a charge connection time.

The connection module 304 generates a connection signal to indicate that the vehicle is connected to the charge station 193 and sends the connection signal to the verification module 306. The connection module 304 may also send data describing the charge connection time to one or more of the journey estimation module 308 and the scheme determination module 312.

The verification module 306 can be software including routines for verifying one or more electrical characteristics associated with the battery 197 in the vehicle. The verification module 306 may be coupled to the bus 320 via a signal line 326. In some implementations, the verification module 306 receives from the connection module 304 a connection signal that indicates the vehicle is connected to the charge station 193. The verification module 306 receives a device ID identifying the vehicle and a battery ID identifying the battery 197 from the vehicle.

The verification module 306 receives one or more electrical characteristics of the battery 197 from the vehicle. Example electrical characteristics associated with the battery 197 may include, but are not limited to, a current state of charge for the battery 197, a maximum ampere rate for charging the battery 197, a range of voltages used to charge the battery 197, a lag time associated with the battery 197, waveform characteristics associated with the battery 197, an ambient temperature surrounding the battery 197, a battery temperature, and information describing other electrical characteristics of the battery 197. A state of charge may indicate a charge level of the battery 197. For example, a state of charge indicates that the battery 197 is 80% charged. The lag time describes a charge delay time for the battery 197. For example, the lag time describes an amount of time needed for the battery 197 to start charging after applying a voltage to terminals of the battery 197.

Responsive to receiving the connection signal, the verification module 306 verifies the one or more electrical characteristics of the battery 197 as a safety precaution before charging the battery 197. For example, the verification module 306 uses the lag time and waveform characteristics to identify a type of the battery 197. The verification module 306 then verifies that a current ampere rate to charge the battery 197 is not greater than a maximum ampere rate for the type of the battery 197 and a voltage applied to the battery 197 falls within a voltage range for the type of the battery 197. In another example, the verification module 306 verifies that a temperature of the battery 197 is in a normal range for charging the battery 197.

In some implementations, the verification module 306 generates a verification signal describing that the one or more electrical characteristics of the battery 197 are verified. The verification module 306 sends the verification signal to one or more of the state determination module 310 and the scheme determination module 312.

The journey estimation module 308 can be software including routines for estimating a future journey for a vehicle associated with a user. The journey estimation module 308 may be coupled to the bus 320 via a signal line 328. In some implementations, the journey estimation module 308 receives historical journey data associated with the vehicle or the user from the memory 327 or the storage device 341 and estimates a future journey for the vehicle based on the historical journey data. For example, the journey estimation module 308 estimates a departure time, a destination, a journey duration, a travel route, and other journey context data associated with the future journey. In a further example, if the historical journey data indicates that the user usually drives to work from home between 8:00 AM and 8:30 AM in weekdays, the journey estimation module 308 estimates a departure time for a future journey in a weekday morning as 8:00 AM and a destination for the future journey as a work location associated with the user.

In some implementations, the journey estimation module 308 receives time synchronicity data from the memory 327 and determines a synchronized local time associated with the vehicle based on the time synchronicity data. The journey estimation module 308 receives weather data from a weather server (not shown), calendar data from the calendar server 151, and social network data from the social network server 155. The journey estimation module 308 determines a future journey including a departure time of the future journey for the vehicle based on one or more of the synchronized local time, the weather data, the calendar data, and the social network data. For example, if the calendar data indicates that the user has a doctor appointment at 9:00 AM in a next morning and a travel time from home to the doctor's office is less than half an hour, the journey estimation module 308 may estimate a departure time from home in the next morning as 8:30 AM. However, if the weather data indicates that there may be a snow storm in the next morning, the journey estimation module 308 may estimate the departure time in the next morning as 8:15 AM in case the user leaves home earlier and needs more time to travel to the doctor's office due to the snow storm.

In some implementations, the user may input data describing one or more future journeys (e.g., one or more departure times and one or more destinations for the one or more future journeys) using a user interface. The journey estimation module 308 stores the data inputted by the user in the memory 327 or the storage device 341.

In some implementations, the journey estimation module 308 sends data describing the future journey to one or more of the state determination module 310 and the scheme determination module 312. In some other implementations, the journey estimation module 308 stores the data in the storage device 341 or the memory 327.

The state determination module 310 can be software including routines for determining a target state of charge for the vehicle. The state determination module 310 may be coupled to the bus 320 via a signal line 330. In some implementations, the state determination module 310 determines a current state of charge for the battery 197 at a charge connection time when the vehicle is connected to the charge station 193. The state determination module 310 determines a charge completion time for the vehicle so that the charging of the vehicle may complete at the charge completion time. The charge completion time may be a time no later than the departure time of the future journey. For example, the charge completion time may be ten minutes earlier than the departure time. In some implementations, the charge completion time may be determined by the user. Alternatively, the charge completion time may be determined automatically by the state determination module 310 based on the departure time of the future journey.

The state determination module 310 determines a target state of charge for the battery 197 at the charge completion time. The target state of charge may be a state of charge that satisfies a usage requirement of the vehicle. For example, the state determination module 310 determines the target state of charge based on one or more estimated future journeys associated with the user, where the user is estimated to take the one or more future journeys before recharging the vehicle again. The target state of charge of the battery 197 may be configured such that the vehicle has sufficient power to complete at least the one or more future journeys.

For example, if the one or more future journeys indicate that the user will drive the vehicle to work and a grocery store tomorrow, the state determination module 310 may determine the target state of charge for the battery 197 as 70% full of the battery 197. The 70%-full battery 197 may have sufficient power for the user to drive the vehicle from home to work, from work to the grocery store, and then back to home from the grocery store.

The target state of charge may also be configured such that a state of charge of the battery 197 after completion of the one or more future journeys may be no less than a threshold. For example, after completion of the one or more journeys, the battery 197 does not deplete and may still have a state of charge no less than 15% full of the battery 197.

Alternatively or additionally, the target state of charge may be an optimal state of charge that may extend an operational life of the battery 197. For example, an optimal state of charge for the battery 197 may be 70%-80% full of the battery 197 rather than 100% full of the battery 197. The battery 197 may not be charged to 100% full of its capacity since repeatedly charging the battery 197 to its full capacity may reduce the operational life of the battery 197. The target state of charge for the battery 197 may be less than 100% full of the battery's capacity and may be 70%-80% full of the battery's capacity.

In some implementations, the state determination module 310 sends data describing the target state of charge to the scheme determination module 312. In some other implementations, the state determination module 310 stores the data describing the target state of charge in the storage device 341 or the memory 327.

The scheme determination module 312 can be software including routines for determining charge schemes that may be used to charge vehicles. The scheme determination module 312 may be coupled to the bus 320 via a signal line 332. A charge scheme for charging a vehicle may describe when and how to charge the vehicle. For example, the charge scheme may include one or more time slots used to charge the vehicle and one or more voltages or ampere rates configured to charge the vehicle during the one or more time slots. The charge scheme may be associated with a combining charge cost incurred by charging the vehicle according to the charge scheme. In some implementations, the combining charge cost includes a power cost and a battery degradation cost. The power cost may include a cost related to power rates and a total amount of power used to charge the battery 197 of the vehicle from a current state of charge to a target state of charge.

The battery degradation cost may include an estimated cost related to a degradation of the battery 197, where the degradation may be caused by the charging of the battery 197. The battery 197 may have a finite operational life due to occurrence of unwanted chemical or physical changes to, or loss of, active materials of which the battery 197 is made of. The operational life of the battery 197 may be extended by preventing or reducing occurrence of the unwanted parasitic chemical effects which occur in battery cells. In some implementations, the battery degradation cost associated with the charge scheme may be determined based on whether the charge scheme helps to extend an operational life of the battery 197. Strategies to extend the operational life of the battery 197 are described below.

In some implementations, the battery degradation cost includes one or more of: (1) a speed degradation cost describing battery degradation related to a charge speed (e.g., degradation caused by a fast charge speed); (2) a temperature degradation cost describing battery degradation related to a battery temperature or an ambient temperature (e.g., degradation caused by a high battery temperature); (3) a low-SOC degradation cost describing battery degradation related to a low-SOC duration (e.g., degradation caused by depletion of the battery 197); and (4) a high-SOC degradation cost describing battery degradation related to a high-SOC duration (e.g., degradation caused by maintaining a relatively high state of charge such as 95% full of the battery). The battery degradation cost may include other types of degradation costs. The various types of degradation costs included in the battery degradation cost are described below in more detail.

The low-SOC duration may include one or more time periods during which the battery 197 has a state of charge lower than a first threshold. For example, the low-SOC duration may include a time period during which the battery 197 is in a depletion status. The high-SOC duration may include one or more time periods during which the battery 197 has a state of charge greater than a second threshold. For example, the high-SOC duration may include a time period during which the battery 197 maintains a target state of charge with 95% full of the battery 197.

One or more strategies may be used to improve the operational life of the battery 197. An example strategy may include reducing a charge speed (or an ampere rate) used to charge the battery 197. For example, assume that a first charge scheme indicates to charge the battery 197 slowly using a first ampere rate while a second charge scheme indicates to charge the battery 197 rapidly using a second ampere rate. The second ampere rate is higher than the first ampere rate. The operational life of the battery 197 may be extended if the first charge scheme is used to charge the battery 197 rather than using the second charge scheme. Thus, a first speed degradation cost associated with the first charge scheme may be lower than a second speed degradation cost associated with second charge scheme.

Another example strategy to increase the operational life of the battery 197 may include reducing a high-SOC duration during which the battery 197 maintains the target state of charge, since a longer high-SOC duration may cause more battery degradation. For example, the battery 197 may achieve the target state of charge at a first timestamp before the charge completion time. Then, the battery 197 is disconnected from charging and maintains the target state of charge until a second timestamp. The second timestamp may describe a time when the vehicle departs. The high-SOC duration may be a time period between the first timestamp and the second timestamp. A corresponding high-SOC degradation cost may be reduced and the operational life of the battery 197 may be extended if the charge scheme is modified to reduce the high-SOC duration. For example, the high-SOC duration may be reduced if the charge scheme uses time slots close to the charge completion time to charge the vehicle rather than using other time slots that are not close to the charge completion time.

Yet another example strategy to increase the operational life of the battery 197 may include reducing a low-SOC duration during which the battery 197 has a state of charge lower than a threshold. The threshold may be 2%, 5%, 10%, or another percentage of a full capacity of the battery 197. Since depletion of the battery 197 may cause battery degradation, a longer low-SOC duration may incur a greater low-SOC degradation cost. Thus, if a current state of charge of the battery 197 is lower than the threshold, a smaller low-SOC degradation cost may be incurred if the battery 197 is charged immediately rather than being charged after a period of time.

Yet another example strategy to increase the operational life of the battery 197 may include maintaining an ambient temperature surrounding the battery 197 or a battery temperature below a temperature threshold, since a higher ambient temperature or battery temperature may cause a higher temperature degradation cost. For example, a case or a cover of the battery 197 may be made of materials that dissipate heat faster than other materials.

The scheme determination module 312 determines a charge objective for the vehicle. The charge objective may define a goal to achieve during a charging process of the vehicle. For example, the charge objective may indicate to charge the battery 197 of the vehicle with a reduced power cost (e.g., a lowest power cost) such that the vehicle may be charged in available time slots that are associated with lowest power rates. In another example, the charge objective may indicate to charge the battery 197 in a manner that may reduce the battery degradation cost and may extend the operational life of the battery 197. In yet another example, the charge objective may indicate to charge the battery 197 with a reduced power cost as well as in a manner that may reduce the battery degradation cost and may extend the operational life of the battery 197.

In some implementations, the charge objective may include minimizing the combining charge cost caused by the charging of the battery 197. A charge scheme that achieves the charge objective may be referred to as a battery-friendly charge scheme. For example, the battery-friendly charge scheme may be a charge scheme having a minimal combining charge cost. In another example, the battery-friendly charge scheme may improve an operational life of the battery 197 if the battery 197 is charged according to the battery-friendly charge scheme. Determination of the battery-friendly charge scheme is described below in more detail.

In some implementations, a combining charge cost associated with a charge scheme may include a weighted sum of a power cost and a battery degradation cost associated with the charge scheme. For example, the combining charge cost includes a sum of the power cost weighted by a first scaling factor and the battery degradation cost weighted by a second scaling factor. In yet another example, the combining charge cost includes a sum of the power cost weighted by a first scaling factor, a speed degradation cost weighted by a second scaling factor, a high-SOC degradation cost weighted by a third scaling factor, a low-SOC degradation cost weighted by a fourth scaling factor, and a temperature degradation cost weighted by a fifth scaling factor.

The various scaling factors may represent respective priorities of the power cost and the various types of degradation costs within the combining charge cost. The scaling factors may be determined automatically by the scheme determination module 312. Alternatively or additionally, the scaling factors may be determined based on a default charge setting associated with the user. For example, the user may configure the default charge setting to set values for the scaling factors. Different users may select different values for the scaling factors so that the power cost and the various types of degradation costs may be weighted differently for the users. For example, a first user that focuses on reducing the power cost may select a larger scaling factor (e.g., "1") to weight the power cost and a smaller scaling factor (e.g., "0") to weight the battery degradation cost. Thus, the power cost is weighted more heavily than the battery degradation cost in the combining charge cost, and the charge objective to minimize the combining charge cost may focus on reducing the power cost.

In another example, a second user that focuses on reducing the battery degradation cost and extending the operational life of the battery 197 may select a larger scaling factor (e.g., "1") to weight the battery degradation cost and a smaller scaling factor (e.g., "0") to weight the power cost. Thus, the battery degradation cost is weighted more heavily than the power cost in the combining charge cost, and the charge objective to minimize the combining charge cost may focus on reducing the battery degradation cost.

In yet another example, a third user that focuses on reducing both the power cost and the battery degradation cost may select a first scaling factor (e.g., "1") to weight the battery degradation cost and a second scaling factor (e.g., "1") to weight the power cost. Thus, the combining charge cost includes a weighted combination of the battery degradation cost and the power cost, and the charge objective to minimize the combining charge cost may be equivalent to simultaneously reduce the battery degradation cost and the power cost.

In some implementations, an objective function may be used to describe charge objectives for the vehicle. An example objective function is provided below:

$$\min_{P(t)} C(P(t)) = \alpha \underbrace{\int_{T_0}^{T_0+T} M(t)P(t)\,dt}_{\text{power cost}} +$$

$$\beta \underbrace{\int_{T_0}^{T_0+T} (T_0 + T - t)B_Q(Q(t))\,dt}_{\text{high-SOC degration cost}} + \gamma \underbrace{\int_{T_0}^{T_0+T} B_{PT}(P(t), Q(t), \tau))\,dt}_{\text{speed-temperature degradation cost}},$$

subject to $$\int_{T_0}^{T_0+T} P(t)\,dt = Q',$$

where $$Q(t) = Q_0 + Q' = Q_0 + \int_{T_0}^{T_0+T} P(t)\,dt;$$

$\alpha$, $\beta$, and $\gamma$ represent scaling factors; $M(t)$ represents a power rate at time t; $P(t)$ represents a charging power at time t; $Q(t)$ represents an amount of power or energy at time t; $B_Q(Q(t))$ represents a high-SOC degradation function at time t; $B_{PT}(P(t), Q(t), \tau)$ represents a degradation function related to a charging power and a temperature at time t; $T_0$ represents a current time; T represents a duration available for charging; $Q_0$ represents an amount of power or energy at time $T_0$; $Q'$ represents an amount of power or energy to charge; and $\tau$ represents an ambient or battery temperature. Other example objective functions are possible.

By changing values for the scaling factors in the objective function, various charge objectives may be obtained. For example, referring to the above example objective function, the following Table 1 includes scaling factors for a first, second, and third charge objectives. The first charge objective focuses on reducing a power cost. A first charge scheme that satisfies the first charge objective may be associated with a lowest power cost when compared to power costs of the second and third charge schemes. The second charge objective focuses on reducing a battery degradation cost (e.g., a most battery-friendly objective). A second charge scheme that satisfies the second charge objective may be associated with a lowest battery degradation cost when compared to battery degradation costs of the first and third charge schemes. The third charge objective focuses on reducing the power cost and the battery degradation cost (e.g., a moderate battery-friendly objective). A third charge scheme that satisfies the third charge objective may be associated with a moderate power cost and a moderate battery degradation cost when compared to power costs and battery degradation costs of the first and second charge schemes.

TABLE 1

Scaling Factors

| | Scaling factor for power cost ($\alpha$) | Scaling factor for high-SOC degradation cost ($\beta$) | Scaling factor for speed-temperature degradation cost ($\gamma$) |
|---|---|---|---|
| First charge objective aiming at reducing power cost | 1 | 0 | 0 |

TABLE 1-continued

Scaling Factors

| | Scaling factor for power cost ($\alpha$) | Scaling factor for high-SOC degradation cost ($\beta$) | Scaling factor for speed-temperature degradation cost ($\gamma$) |
|---|---|---|---|
| Second charge objective aiming at reducing battery degradation | 0 | 1 | 1 |
| Third charge objective aiming at reducing power cost and battery degradation | 1 | 1 | 1 |

For a particular charge objective with associated values for the scaling factors, an optimal charge scheme that satisfies the particular charge objective may be derived from a minimization of the objective function with the associated values for the scaling factors. Different charge objectives may be associated with different optimal charge schemes and different minimal combining charge costs. In some implementations, an optimal charge scheme to achieve a particular charge objective may be a battery-friendly charge scheme if the particular charge objective takes battery degradation into consideration (e.g., $\beta>0$ and/or $\gamma>0$). Charging the vehicle according to a battery-friendly charge scheme may help to extend the operational life of the battery 197.

In some implementations, the scheme determination module 312 receives DR event data describing one or more DR events from the DR event notification application 111. The scheme determination module 312 analyzes the DR event data to determine one or more DR requirements. For example, the scheme determination module 312 determines one or more DR event periods during which vehicle charging may not be recommended. In some implementations, a DR event period in a local area may represent a peak demand period during which vehicles in the local area may not be charged. In some other implementations, a DR event period may represent a time period during which power usage in a local area may not exceed a certain amount of electricity to keep power supply and power demand in balance. Other DR event periods are possible.

The scheme determination module 312 determines one or more available time slots for charging the vehicle based on the one or more DR requirements. For example, the scheme determination module 312 determines one or more available time slots that satisfy the one or more DR requirements. The one or more available time slots occur after the charge connection time and before the charge completion time (or, before the departure time). The one or more available time slots may not overlap with the one or more DR event periods. In some implementations, a time period starting from the charge connection time and ending at the charge completion time (or, ending at the departure time) may be separated into one or more available time slots and one or more DR event periods, where the one or more available time slots may not overlap with the one or more DR event periods.

For example, assume a vehicle is connected to a home charge station at 5:00 PM. The vehicle is estimated to depart from home at 8:00 AM in the next morning. The state determination module 310 determines a charge completion time for the vehicle as 7:40 AM in the next morning. The DR event data indicates that a DR event period starts from 8:00 PM and lasts until 12:00 AM in the midnight. The scheme determination module 312 determines a first available time slot as a time period from 5:00 PM to 8:00 PM, a DR event period as a time period from 8:00 PM to 12:00 AM, and a second available time slot as a time period from 12:00 AM to 7:40 AM in the next morning.

The scheme determination module 312 determines a set of potential charge schemes based on the one or more available time slots. For each potential charge scheme, a state of charge for the battery 197 at the charge completion time may achieve the target state of charge if the battery 197 is charged according to the corresponding potential charge scheme. A potential charge scheme may include: (1) one or more time slots from the one or more available time slots; (2) one or more charge speeds (e.g., one or more ampere rates or charge voltages describing the one or more charge speeds) to be applied in the one or more time slots; and (3) a charging type (e.g., AC charging or DC charging). The potential charge scheme may include other data for configuring the charging of the vehicle.

In some implementations, the scheme determination module 312 may receive power grid data from the power system 199. The scheme determination module 312 may determine the set of potential charge schemes further based on the power grid data. For example, each potential charge scheme may include respective time slots during which an estimated total power demand in a power grid system is below a predetermined threshold, so that a risk of overloading the power grid system may be reduced.

The scheme determination module 312 receives power rate data from the server 113 or the utility server 178. The scheme determination module 312 determines a set of power costs associated with the set of potential charge schemes based on the power rate data. For example, for each potential charge scheme, the scheme determination module 312 determines a corresponding power cost associated with the vehicle charging if the vehicle is charged during the one or more time slots included in the corresponding potential charge scheme.

The scheme determination module 312 estimates a set of battery degradation costs associated with the set of potential charge schemes. For example, for each potential charge scheme, the scheme determination module 312 estimates a corresponding battery degradation cost associated with the vehicle charging if the vehicle is charged according to the corresponding potential charge scheme. In some implementations, the battery degradation cost may include a high-SOC degradation cost, a low-SOC degradation cost, a speed degradation cost, a temperature degradation cost, and other types of battery degradation costs.

In some implementations, the scheme determination module 312 determines a battery degradation function for the battery 197. Alternatively, a user may input data to configure a battery degradation function for the battery 197. The battery degradation function may describe how the battery 197 degrades in terms of one or more degradation factors. Example degradation factors include, but are not limited to: an ambient or battery temperature; a charge speed (e.g., a charging power describing power charged per second, per minute, or per hour) related to one or more of a charge ampere rate or a charge voltage; a high-SOC duration during which the battery 197 maintains a state of charge above a first threshold (e.g., a duration during which the battery 197 maintains the target state of charge before the vehicle departs); a low-SOC duration during which the battery 197 maintains a state of charge below a second threshold (e.g., a duration during which the battery 197 is in a depletion status); and other possible degradation factors. The scheme determination module 312 may estimate a corresponding battery degradation cost for each potential charge scheme based on the battery degradation function.

The scheme determination module 312 determines a set of combining charge costs for the set of potential charge schemes based on the set of power costs and the set of battery degradation costs. For example, the scheme determination module 312 determines a charge objective associated with charging the vehicle. The scheme determination module 312 determines a first scaling factor applied to weight power costs and a second scaling factor applied to weight battery degradation costs based on the charge objective. For each potential charge scheme, the scheme determination module 312 determines a corresponding combining charge cost as a sum of a corresponding power cost weighted by the first scaling factor and a corresponding battery degradation cost weighted by the second scaling factor.

Alternatively, the scheme determination module 312 determines, based on the charge objective, one or more of a first scaling factor applied to weight power costs, a second scaling factor applied to weight speed degradation costs, a third scaling factor applied to weight high-SOC degradation costs, a fourth scaling factor applied to weight low-SOC degradation costs, and a fifth scaling factor applied to weight temperature degradation costs. For each potential charge scheme, the scheme determination module 312 determines a corresponding combining charge cost by summing up one or more of a corresponding power cost weighted by the first scaling factor, a corresponding speed degradation cost weighted by the second scaling factor, a corresponding high-SOC degradation cost weighted by the third scaling factor, a corresponding low-SOC degradation cost weighted by the fourth scaling factor, and a corresponding temperature degradation cost weighted by the fifth scaling factor.

The scheme determination module 312 determines, from the set of potential charge schemes, a potential charge scheme that has a minimal combining charge cost from the set of combining charge costs. The scheme determination module 312 determines a battery-friendly charge scheme as the potential charge scheme having the minimal combining charge cost. Thus, the battery-friendly charge scheme has a combining charge cost satisfying the charge objective. For example, the battery-friendly charge scheme has the minimal combining charge cost satisfying the charge objective. Additionally, the battery 197 is capable of achieving the target state of charge at the charge completion time or the departure time if the battery-friendly charge scheme is applied to charge the battery 197.

In some implementations, the battery-friendly charge scheme may include one or more available time slots with lower power rates than other available time slots. Thus, a power cost associated with the battery-friendly charge scheme may be lower than other power costs caused by charging the battery 197 using the other available time slots. In some other implementations, the battery-friendly charge scheme may include one or more available time slots that are closer to the charge completion time or the departure time than other available time slots. Thus, a high-SOC duration associated with the battery-friendly charge scheme may be shorter than other high-SOC durations associated with other charge schemes. The battery-friendly charge scheme may help to extend the operational life of the battery 197.

In some implementations, the scheme determination module 312 stores data describing the battery-friendly charge scheme in the storage device 341 or the memory 327. In some other implementations, the scheme determination module 312 sends data describing the battery-friendly charge scheme to the charge implementation module 314.

The charge implementation module 314 can be software including routines for implementing a charge scheme for the vehicle. The charge implementation module 314 may be coupled to the bus 320 via a signal line 334. In some implementations, the charge implementation module 314 receives data describing a charge scheme (e.g., a battery-friendly charge scheme) from the scheme determination module 312. The charge implementation module 314 charges the battery 197 in the vehicle based on the charge scheme. For example, the charge implementation module 314 charges the battery 197 using one or more time slots and one or more charge speeds specified in the charge scheme. The charge implementation module 314 may charge the battery 197 to the target state of charge and then stop charging the battery 197. The charge implementation module 314 may electronically disconnect the battery 197 from the charge station 193 after the battery 197 achieves the target state of charge.

The user interface module 316 can be software including routines for generating graphical data for providing user interfaces. The user interface module 316 may be coupled to the bus 320 via a signal line 335. In some implementations, the user interface module 316 generates graphical data for providing a user interface that depicts one or more charge schemes for a user. The one or more charge schemes may include a battery-friendly charge scheme. The user interface module 316 sends the graphical data to the client device 103 (e.g., a smartphone, a tablet, etc.), causing the client device 103 to present the user interface to the user. The user may configure or select the battery-friendly charge scheme using the user interface. For example, the user may use the user interface to modify a default charge setting and to provide feedback for the determination of the battery-friendly charge scheme.

In some implementations, the user interface module 316 generates graphical data for providing a user interface that allows the user to specify a charge objective. For example, the user may use the user interface to specify one or more of a battery degradation function, a scaling factor for a power cost, and scaling factors for different types of battery degradation costs. Alternatively or additionally, the user interface module 316 may generate graphical data for providing a user interface that allows the user to specify one or more preferences to charge the vehicle. The user interface module 316 may generate graphical data for providing other user interfaces to users.

An example application of the charge system 191 includes determining individualized battery-friendly charge schemes for a group of vehicles in a local area. The individualized battery-friendly charge schemes may satisfy DR requirements in the local area and may avoid overloading a power grid system in the local area with the charging of the group of vehicles. Each individualized battery-friendly charge scheme may charge a battery of a corresponding vehicle to a target state of charge that satisfies a usage requirement of the corresponding vehicle.

Methods

Figure 4:
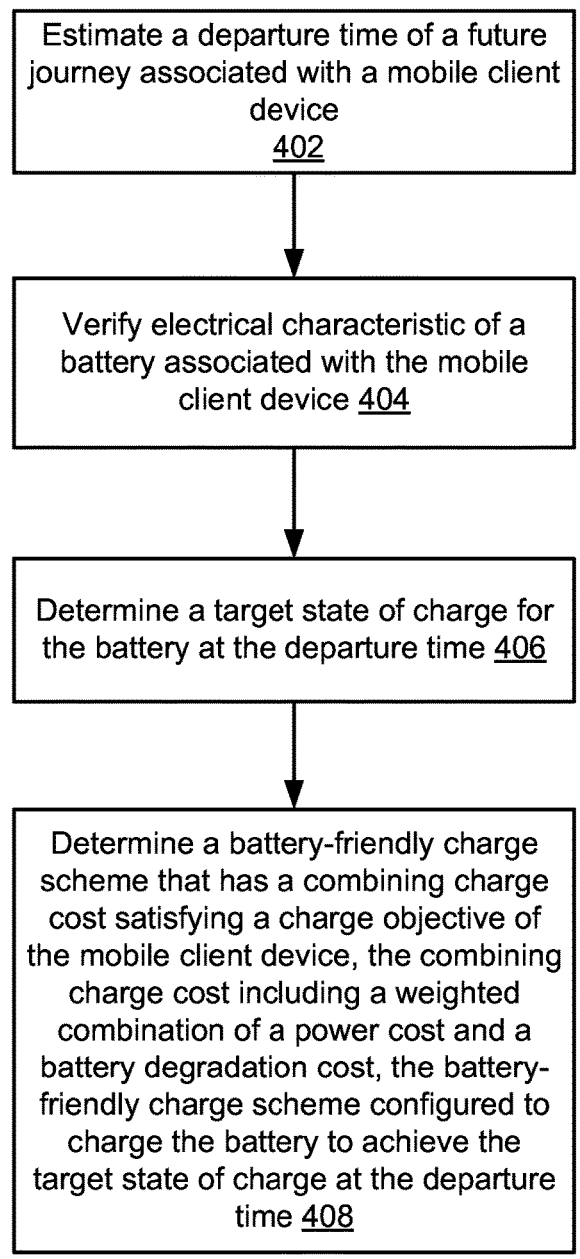
FIG. 4 is a flowchart of an example method for providing charging services to mobile client devices.

Referring now to FIG. 4, an example of a method 400 for providing charging services to mobile client devices is described. In some implementations, the journey estimation module 308 estimates 402 a departure time of a future journey associated with a mobile client device (e.g., a vehicle). For example, the journey estimation module 308 estimates the departure time based on historical journey data associated with the mobile client device or historical journey data associated with a user operating the mobile client device. The verification module 306 verifies 404 one or more electrical characteristics of a battery (e.g., the battery 197) associated with the mobile client device. The state determination module 310 determines 406 a target state of charge for the battery at a departure time responsive to verifying the one or more electrical characteristics of the battery. The scheme determination module 312 determines 408 a battery-friendly charge scheme that has a combining charge cost satisfying a charge objective of the mobile client device. The combining charge cost includes a weighted combination of a power cost and a battery degradation cost. The battery-friendly charge scheme may be configured to charge the battery to achieve the target state of charge at the departure time. The battery-friendly charge scheme may improve an operational life of the battery.

Figure 5A:
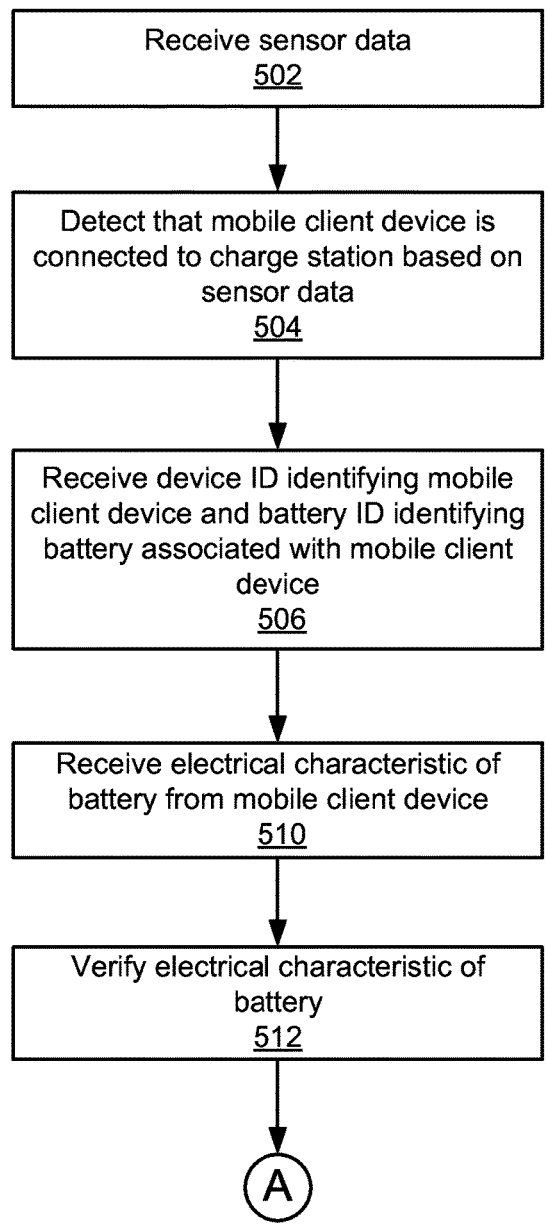
FIGS. 5A-5C are flowcharts of another example method for providing charging services to mobile client devices.
Figure 5B:
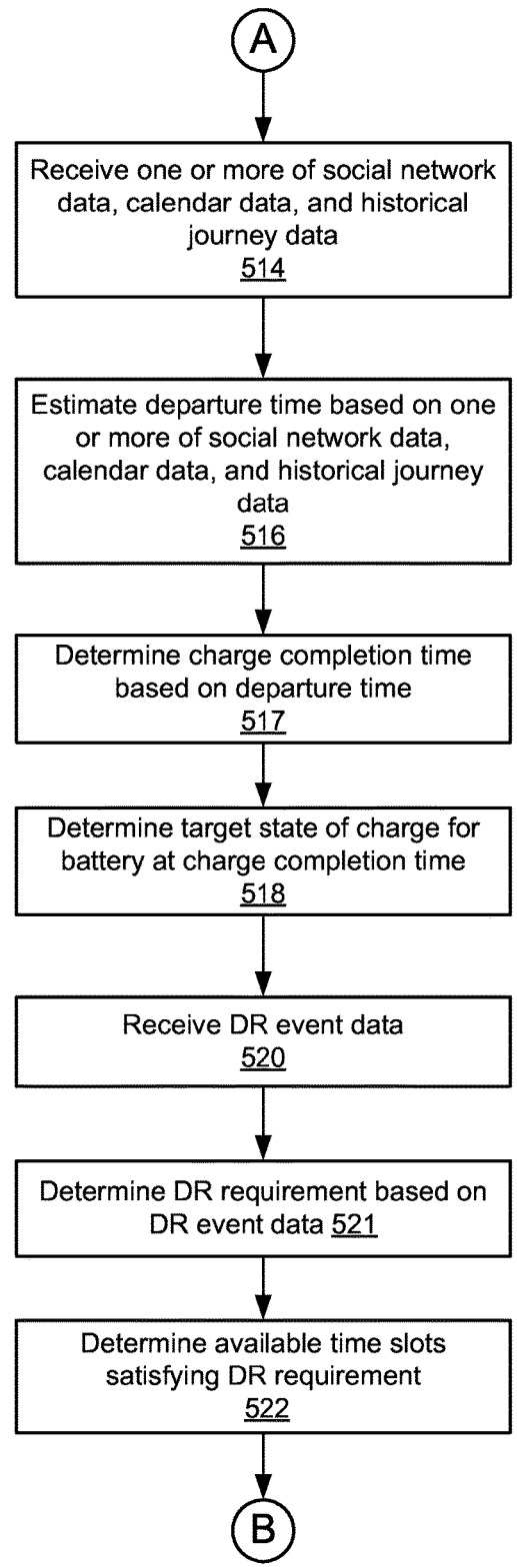
Figure 5C:
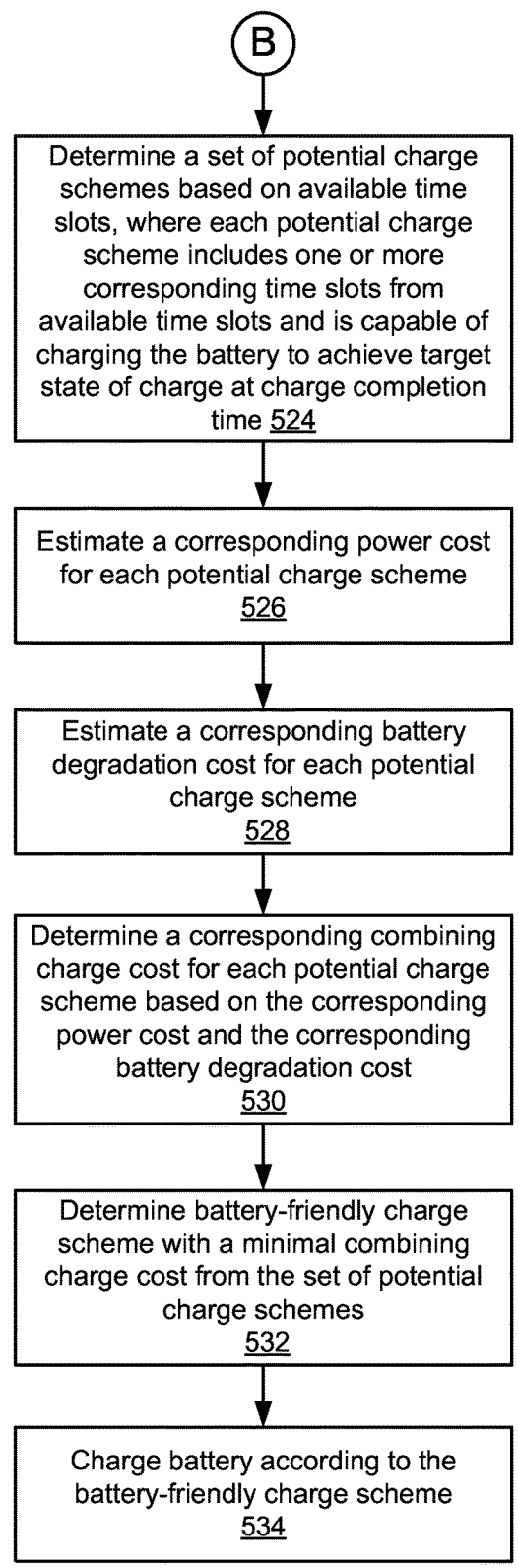

FIGS. 5A-5C are flowcharts of another example method 500 for providing charging services to mobile client devices according to some implementations. Referring to FIG. 5A, the communication module 302 receives 502 sensor data from the one or more sensors 135. The connection module 304 detects 504 that a mobile client device (e.g., a vehicle) is connected to a charge station (e.g., the charge station 193) based on the sensor data. The communication module 302 receives 506 a device ID identifying the mobile client device and a battery ID identifying a battery (e.g., the battery 197) associated with the mobile client device. The communication module 302 receives 510 one or more electrical characteristics of the battery from the mobile client device. The verification module 306 verifies 512 the one or more electrical characteristics of the battery.

Referring to FIG. 5B, the communication module 302 receives 514 one or more of social network data, calendar data, and historical journey data associated with a user operating the mobile client device. The journey estimation module 308 estimates 516 a departure time of a future journey associated with the user based on one or more of the social network data, the calendar data, and the historical journey data. The state determination module 310 determines 517 a charge completion time based on the departure time. The state determination module 310 determines 518 a target state of charge for the battery at the charge completion time or the departure time. The communication module 302 receives 520 DR event data from the DR server 101. The scheme determination module 312 determines 521 one or more DR requirements based on the DR event data. The scheme determination module 312 determines 522 one or more available time slots satisfying the one or more DR requirements.

Referring to FIG. 5C, the scheme determination module 312 determines 524 a set of potential charge schemes based on the one or more available time slots. Each potential charge scheme may include one or more time slots from the one or more available time slots and is capable of charging the battery to achieve the target state of charge at the charge completion time or the departure time. The scheme determination module 312 estimates 526 a corresponding power cost for each potential charge scheme so that a set of power costs are generated for the set of potential charge schemes. The scheme determination module 312 estimates 528 a corresponding battery degradation cost for each potential charge scheme so that a set of battery degradation costs are generated for the set of potential charge schemes.

The scheme determination module 312 determines 530 a corresponding combining charge cost for each potential charge scheme based on the corresponding power cost and the corresponding battery degradation cost, so that a set of combining charge costs are generated for the set of potential charge schemes. The scheme determination module 312 determines 532, from the set of potential charge schemes, a battery-friendly charge scheme with a minimal combining charge cost from the set of combining charge costs. The charge implementation module 314 charges 534 the battery according to the battery-friendly charge scheme.

Graphic Representations

Figure 6:
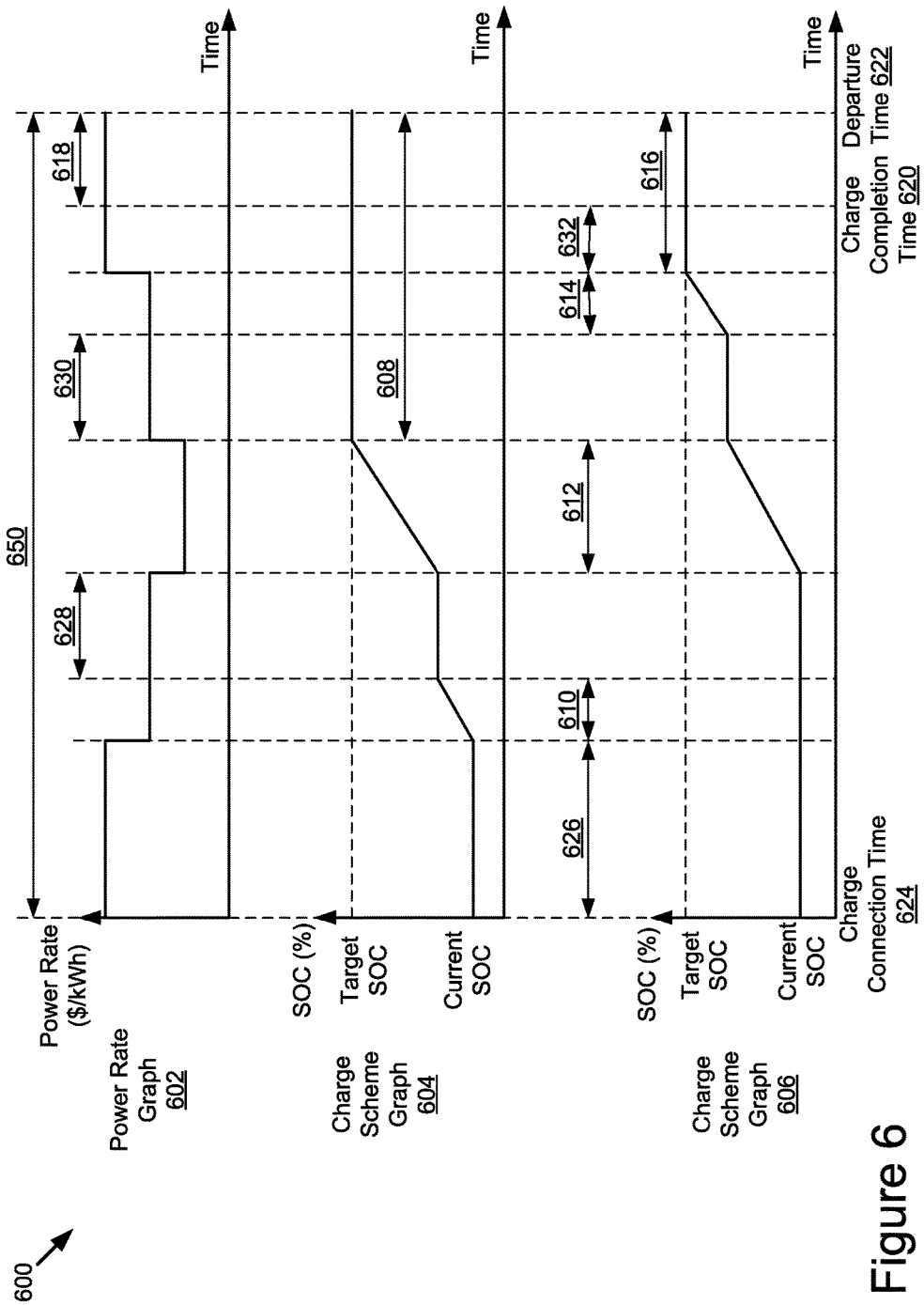
FIG. 6 is a graphic representation illustrating examples of charge schemes.

FIG. 6 is a graphic representation 600 illustrating examples of charge schemes. The graphic representation 600 includes an example power rate graph 602, an example charge scheme graph 604, and another example charge scheme graph 606. The power rate graph 602 depicts a power rate as a function of time within a time window 650 that starts from a charge connection time 624 and ends at a departure time 622. The time window 650 includes DR event periods 628 and 630 during which no battery charging is recommended. Charging of a battery in a vehicle may complete at a charge completion time 620 and may achieve a target state of charge. There may be a time window 618 between the charge completion time 620 and the departure time 622. No battery charging is recommended in the time window 618. In some implementations, a length of the time window 618 may be configured by a user. The time window 650 includes available time slots 626 and 632 with a first power rate, available time slots 610 and 614 with a second power rate, and another available time slot 612 with a third power rate.

The charge scheme graph 604 depicts a state of charge of the battery as a function of time in the time window 650, where a first charge scheme is used to charge the battery. The first charge scheme includes the time slots 610 and 612. For example, the battery is charged in the time slots 610 and 612 so that the battery achieves the target state of charge at the end of the time slot 612. A first high-SOC duration associated with the first charge scheme may be illustrated as a time window 608. In the time window 608, the battery maintains the target state of charge.

The charge scheme graph 606 depicts the state of charge of the battery as a function of time in the time window 650, where a second charge scheme is used to charge the battery. The second charge scheme includes the time slots 612 and 614. For example, the battery is charged in the time slots 612 and 614 so that the battery achieves the target state of charge at the end of the time slot 614. The time slot 632 is not selected to charge the battery because the time slot 632 is associated with a power rate higher than that of the time slots 612 and 614. A second high-SOC duration associated with the second charge scheme may be illustrated as a time window 616. In the time window 616, the battery maintains the target state of charge.

Since the time slots 610 and 614 are associated with the same power rate, the first charge scheme and the second charge scheme may have the same power cost. However, since the second high-SOC duration is shorter than the first high-SOC duration, the second charge scheme may be more battery-friendly than the first charge scheme and may extend an operational life of the battery.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   estimating a departure time of a future journey associated with a mobile client device using a processor configured to perform the estimating;
   verifying one or more electrical characteristics of a battery associated with the mobile client device;
   determining a target state of charge for the battery at the departure time responsive to verifying the one or more electrical characteristics of the battery;
   determining a charge scheme that improves an operational life of the battery, the charge scheme having a combining charge cost that satisfies a charge objective of the mobile client device, wherein a power cost is associated with a first scaling factor, a battery degradation cost is associated with a second scaling factor, the first scaling factor and the second scaling factor are based on different values provided by a user of the mobile client device, and the combining charge cost includes a sum of the power cost weighted by the first scaling factor and the battery degradation cost weighted by the second scaling factor; and
   charging the battery based on the charge scheme, wherein the battery of the mobile client device has the target state of charge at the departure time.

2. The method of claim 1, wherein determining the charge scheme comprises:
   receiving data describing one or more demand response requirements;
   determining one or more available time slots that satisfy the one or more demand response requirements;
   determining a set of potential charge schemes based on the one or more available time slots, each potential charge scheme configured to include one or more corresponding time slots from the one or more available time slots, each potential charge scheme configured to charge the battery to achieve the target state of charge at a charge completion time before the departure time;
   estimating a set of power costs for the set of potential charge schemes;
   estimating a set of battery degradation costs for the set of potential charge schemes;
   determining a set of combining charge costs for the set of potential charge schemes based on the set of power costs and the set of battery degradation costs; and
   determining the charge scheme as a potential charge scheme associated with a minimal combining charge cost from the set of combining charge costs.

3. The method of claim 1, wherein the battery degradation cost includes one or more of a speed degradation cost, a temperature degradation cost, a high-state of charge (SOC) degradation cost, and a low-SOC degradation cost.

4. The method of claim 1, further comprising:
   generating graphical data for providing a user interface that allows the user to specify the charge objective for the mobile client device; and
   receiving from the user the different values for the first scaling factor and the second scaling factor.

5. The method of claim 1, wherein the charge objective includes one or more of charging the battery of the mobile client device with reduced power costs and extending the operational life of the battery.

6. The method of claim 1, wherein the one or more electrical characteristics of the battery include waveform characteristics and a lag time associated with the battery.

7. The method of claim 1, wherein the mobile client device includes a vehicle.

8. A computer program product comprising a non-transitory computer-usable medium including a computer-readable program, wherein the computer-readable program when executed on a computer causes the computer to:
   estimate a departure time of a future journey associated with a mobile client device using a processor configured to perform the estimate;
   verify one or more electrical characteristics of a battery associated with the mobile client device;
   determine a target state of charge for the battery at the departure time responsive to verifying the one or more electrical characteristics of the battery;
   determine a charge scheme that improves an operational life of the battery, the charge scheme having a combining charge cost that satisfies a charge objective of the mobile client device, wherein a power cost is associated with a first scaling factor, a battery degradation cost is associated with a second scaling factor, the first scaling factor and the second scaling factor are based on different values provided by a user of the mobile client device, and the combining charge cost includes a sum of the power cost weighted by the first scaling factor and the battery degradation cost weighted by the second scaling factor; and
   charging the battery based on the charge scheme, wherein the battery of the mobile client device has the target state of charge at the departure time.

9. The computer program product of claim 8, wherein determining the charge scheme comprises:
   receiving data describing one or more demand response requirements;
   determining one or more available time slots that satisfy the one or more demand response requirements;
   determining a set of potential charge schemes based on the one or more available time slots, each potential charge scheme configured to include one or more corresponding time slots from the one or more available time slots, each potential charge scheme configured to charge the battery to achieve the target state of charge at a charge completion time before the departure time;
   estimating a set of power costs for the set of potential charge schemes;
   estimating a set of battery degradation costs for the set of potential charge schemes;
   determining a set of combining charge costs for the set of potential charge schemes based on the set of power costs and the set of battery degradation costs; and
   determining the charge scheme as a potential charge scheme associated with a minimal combining charge cost from the set of combining charge costs.

10. The computer program product of claim 8, wherein the battery degradation cost includes one or more of a speed degradation cost, a temperature degradation cost, a high-state of charge (SOC) degradation cost, and a low-SOC degradation cost.

11. The computer program product of claim 8, wherein:
    generating graphical data for providing a user interface that allows the user to specify the charge objective for the mobile client device; and
    receiving from the user the different values for the first scaling factor and the second scaling factor.

12. The computer program product of claim 8, wherein the charge objective includes one or more of charging the battery of the mobile client device with reduced power costs and extending the operational life of the battery.

13. The computer program product of claim 8, wherein the one or more electrical characteristics of the battery include waveform characteristics and a lag time associated with the battery.

14. The computer program product of claim 8, wherein the mobile client device includes a vehicle.

15. A system comprising:
a processor; and
a memory storing instructions that, when executed, cause the system to:
estimate, using the processor, a departure time of a future journey associated with a mobile client device;
verify one or more electrical characteristics of a battery associated with the mobile client device;
determine a target state of charge for the battery at the departure time responsive to verifying the one or more electrical characteristics of the battery; and
determine a charge scheme that improves an operational life of the battery, the charge scheme having a combining charge cost that satisfies a charge objective of the mobile client device, wherein a power cost is associated with a first scaling factor, a battery degradation cost is associated with a second scaling factor, the first scaling factor and the second scaling factor are based on different values provided by a user of the mobile client device, and the combining charge cost includes a sum of the power cost weighted by the first scaling factor and the battery degradation cost weighted by the second scaling factor; and
charging the battery based on the charge scheme, wherein the battery of the mobile client device has the target state of charge at the departure time.

16. The system of claim 15, wherein the instructions when executed cause the system to determine the charge scheme by:
receiving data describing one or more demand response requirements;
determining one or more available time slots that satisfy the one or more demand response requirements;
determining a set of potential charge schemes based on the one or more available time slots, each potential charge scheme configured to include one or more corresponding time slots from the one or more available time slots, each potential charge scheme configured to charge the battery to achieve the target state of charge at a charge completion time before the departure time;
estimating a set of power costs for the set of potential charge schemes;
estimating a set of battery degradation costs for the set of potential charge schemes;
determining a set of combining charge costs for the set of potential charge schemes based on the set of power costs and the set of battery degradation costs; and
determining the charge scheme as a potential charge scheme associated with a minimal combining charge cost from the set of combining charge costs.

17. The system of claim 15, wherein the battery degradation cost includes one or more of a speed degradation cost, a temperature degradation cost, a high-state of charge (SOC) degradation cost, and a low-SOC degradation cost.

18. The system of claim 15, wherein:
generating graphical data for providing a user interface that allows the user to specify the charge objective for the mobile client device; and
receiving from the user the different values for the first scaling factor and the second scaling factor.

19. The system of claim 15, wherein the charge objective includes one or more of charging the battery of the mobile client device with reduced power costs and extending the operational life of the battery.

20. The system of claim 15, wherein the one or more electrical characteristics of the battery include waveform characteristics and a lag time associated with the battery.

* * * * *